Sept. 28, 1965             R. J. ROSA            3,209,179
MHD GENERATOR FOR PRODUCING A.C. POWER
Filed Dec. 1, 1959            5 Sheets-Sheet 1
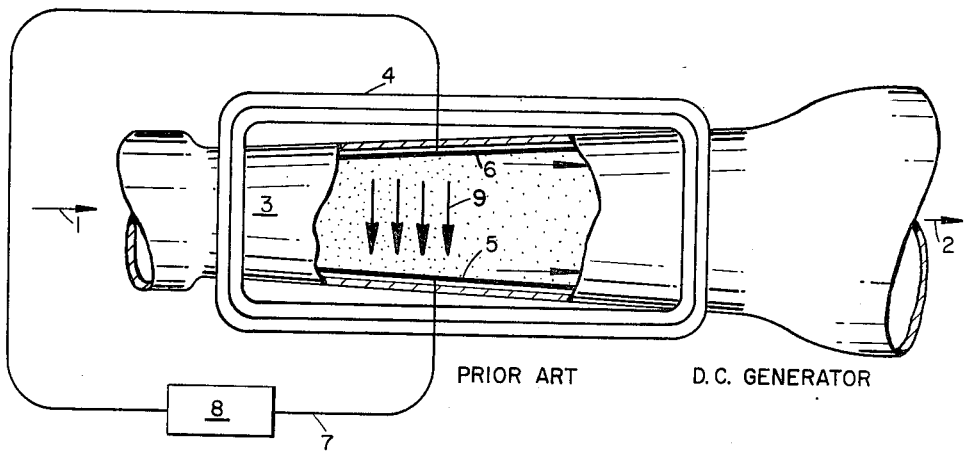
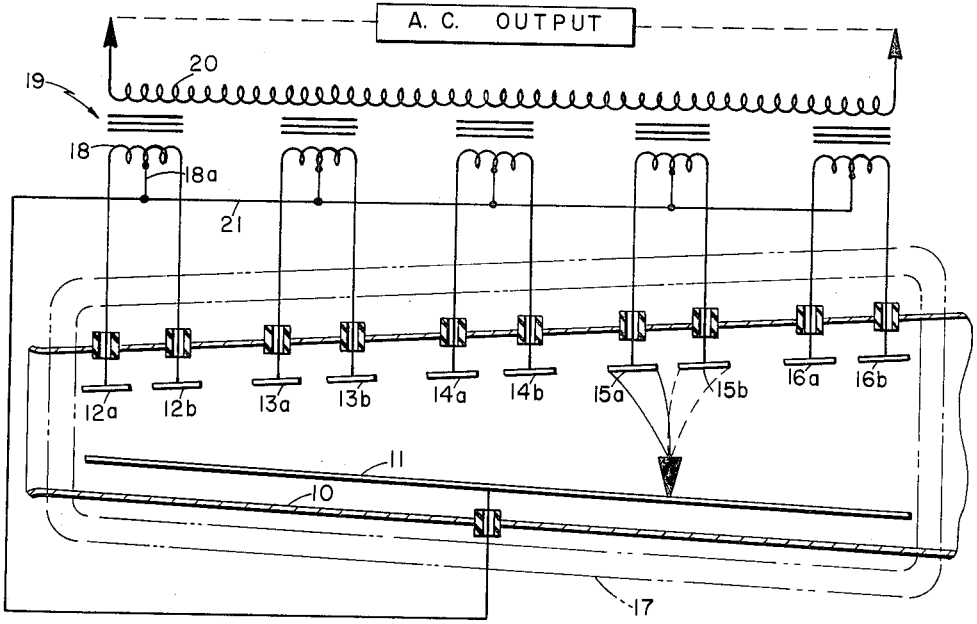
RICHARD J. ROSA
INVENTOR.
BY
ATTORNEYS

RICHARD J. ROSA
INVENTOR.

Sept. 28, 1965  R. J. ROSA  3,209,179
MHD GENERATOR FOR PRODUCING A.C. POWER
Filed Dec. 1, 1959  5 Sheets-Sheet 4
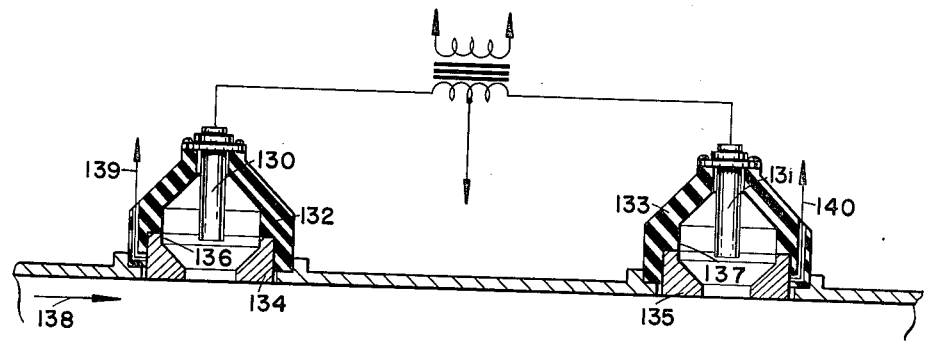
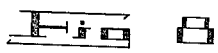
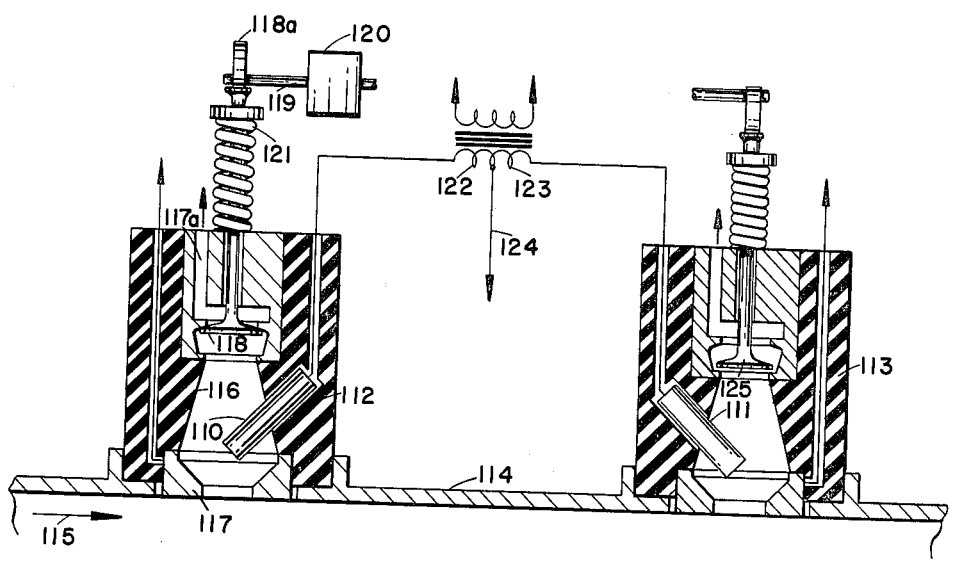
RICHARD J. ROSA
INVENTOR.
BY
ATTORNEYS

United States Patent Office 3,209,179
Patented Sept. 28, 1965

3,209,179
MHD GENERATOR FOR PRODUCING
A.C. POWER
Richard J. Rosa, Reading, Mass., assignor to Avco Corporation, Cincinnati, Ohio, a corporation of Delaware
Filed Dec. 1, 1959, Ser. No. 856,585
20 Claims. (Cl. 310—11)

The present invention relates to electrical generating equipment and more particularly to equipment for generating power by movement of a stream of electrically conductive fluid relative to a magnetic field.

Although the possibility of generating power by the interaction of a conductive fluid and a magnetic field has long been known, it has not been until recent years that such principles have been investigated seriously for use in industry. This is illustrated by the Rudenberg Patent 1,717,413, which issued in 1929, on a Thermoelectric Apparatus, showing that the basic principles are well known. Practical limitations, however, such as the lack of a high temperature source of conductive gas and materials capable of confining such gases, have severely restricted development of practical generators. With the evolution of high temperature heat sources and improved materials, rapid strides have been made in recent years. In fact, work done to date has been so encouraging that public utilities have become vitally interested in such generators (commonly called magnetohydrodynamic generators or, for short, "MHD" generators) for use in stationary power plant installations.

MHD generators require a source of high temperature electrically conductive gas under pressure. From the source the gas flows through the generator with which is associated a magnetic field and electrodes between which a flow of current is induced by movement of the gas relative to the field. The gas exhausts to a sink which may simply be the atmosphere, or in more sophisticated systems, may comprise a recovery system including pumping means for returning the gas to the source.

Using a unidirectional constant magnetic field, conventional MHD generators produce D.C. current. Although direct current is useful for many purposes, it is recognized that alternating current is more suitable for industrial use and for distribution through high voltage systems. For a long time, however, it appeared that the inherently direct current characteristics of MHD generators would severely limit their growth and application; and, until the advent of the present invention, no way was known of building a practical A.C. MHD generator. Admittedly, in theory, alternating current can be produced by pulsing the gas stream as is passes through the generator or by reversing the direction of the magnetic field periodically. In fact, however, such theoretical solutions are impractical and involve modulating an extremely high temperature gas stream at high frequency, or modulating a magnetic field storing large amounts of energy.

Through use of the present invention, it is possible to generate large amounts of A.C. power in a simple and economical manner. Briefly, the invention comprises means for cyclically directing the flow of electrical current through the gaseous conductor to predetermined electrodes within the generator at preselected time intervals. In accordance with the invention this may be done electrically, mechanically, or aerodynamically. Mechanical systems may employ means for physically placing the electrodes in conducting relationship with the moving gas stream. The novel aerodynamic systems provide means for moving the conductive gas into and out of conducting relationship with the electrodes to initiate and terminate conduction. Electrical systems may employ a baffle of controlled electrical potential adjacent the electrodes to regulate flow of current to them.

In view of the foregoing, it is an important object of the present invention to provide an improved MHD generator, and more particularly, a generator for producing A.C. power.

Another object of the invention is to provide an MHD generator having a plurality of electrodes with which flow of current can be established during predetermined time intervals.

A more specific object of the invention is to provide an MHD generator having electrodes which are movable relative to an electrically conductive gas stream whereby conductivity with the gas stream may be established at will.

Another specific object of the invention is to provide a generator having means for inducing a conductive gas stream to establish a conductive path with selected electrodes of the generator at predetermined times.

A further object of the invention is to provide means for interrupting the conductive path existing between a conductive gas stream and an electrode.

A still further object is to provide electrical means for establishing flow of current between a conductive gas stream and selected electrodes of a generator at specific time periods.

The novel features that I consider characteristic of my invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 1 is a diagrammatic illustration of an MHD generator;

FIGURE 2 is a diagram of an MHD generator and related circuits illustrating the underlying principle of producing alternating current;

FIGURE 7 shows a combined mechanical-aerodynamic means for establishing conduction alternately with a pair of electrodes.

FIGURE 8 is a cross sectional view of electrical means for alternately establishing conduction with fixed electrodes.

General description

Figure 3:
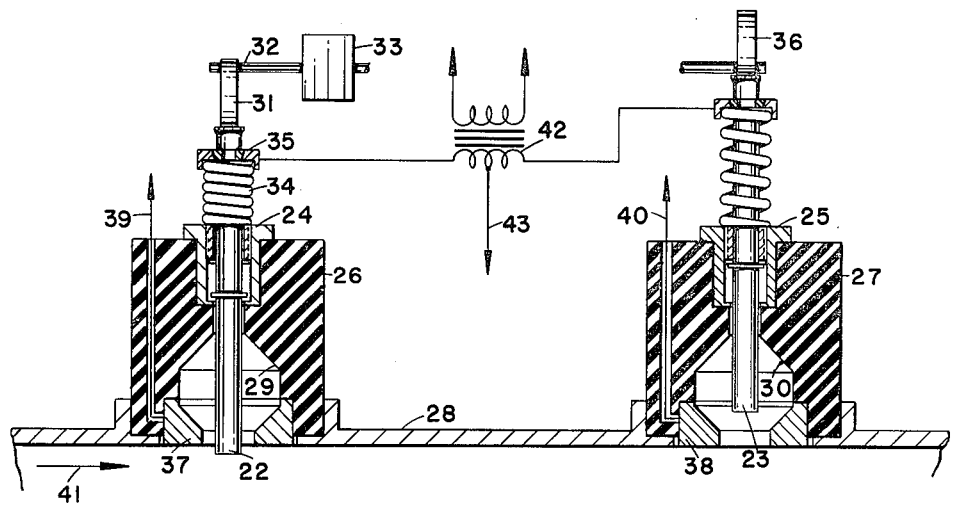
FIGURE 3 is a cross sectional view of mechanical means for alternately establishing conduction between a conductive gas and a pair of electrodes.

FIGURE 1 illustrates an MHD generator of conventional form. To the generator is supplied a high temperature gaseous conductor under pressure from a source, such as a nuclear reactor or a coal-fired furnace, that is not shown. The gas enters the generator as indicated by the arrow at 1 and exhausts from it as indicated by the arrow at 2. The gas is guided and confined in its movement through the generator by a divergent duct 3 which is surrounded by a D.C. field coil 4 that establishes a magnetic flux transverse of the moving gas stream in a direction perpendicular to the plane of the paper. Within the duct are provided electrodes, such as anode 6 and cathode 5, which are connected in circuit, as by a conductor 7, with a load 8. Movement of the gaseous conductor through the magnetic field and between the electrodes induces an E.M.F. between them as indicated by the arrows at 9.

The direction of current flow is a function of the direction of gas movement and the magnetic flux. Assuming movement of the gas from left to right as illustrated, and a magnetic flux emanating from the coil at right angles to the plane of the paper and towards the observer, the E.M.F. is induced in the direction indicated. Assuming uniform gas movement and a constant unidirectional field, the E.M.F. induced is constant in both magnitude and direction. In other words, the generator as illustrated and explained is inherently adapted to the production of direct current.

Electrical conductivity of the gas stream is due to ionization and is a function of both its temperature and composition. Ionization of the gas which, for purposes of illustration but not of limitation, may be assumed as helium or argon, is promoted by an additive, such as 1% sodium, potassium or cesium and by its high temperature of the order of 300° K. Although high conductivity can be promoted through high temperature, limitations are imposed by materials and by thermal power sources utilizing chemical combustion or nuclear reactions. At present it appears that the temperature of gas available for use with MHD generators is not apt to exceed 3000° K. for some time to come. This means that gas conductivities will not greatly exceed about 100 mhos/meter. In fact, to increase conductivity by a factor of 10, would require doubling of gas temperatures. To offset low gas conductivity, it is necessary to use a magnetic field having a great deal of energy stored in it. This makes it difficult, if not impossible, to design an efficient, economical alternating current MHD generator employing an oscillating field. On the other hand, an alternating current MHD generator employing a static field but an oscillating gas flow is also hard to design because of the high gas temperature and flow rates that must be handled in an industrial size generator. Use of inverter circuits in conjunction with MHD generators has also been considered. Because of present costs and energy losses in inverters, it is clearly advantageous to perform the inversion process within the generator itself. In fact, an MHD generator having current carrying electrodes, has some of the essential features of an inverter and lends itself to direct generation of A.C. power, as will now be explained.

*General principles of alternating current MHD generators*

Attention is directed to FIGURE 2 which shows schematically certain elements of an MHD generator arranged for generation of alternating current power. The divergent duct 10 surrounds cathode 11 and a plurality of anodes grouped in pairs and identified as 12a, 12b–16a, 16b. Associated with the duct is a coil 17 for establishing a transverse magnetic field as has been described with FIGURE 1.

Each pair of electrodes is connected to the ends of a transformer primary. Thus, anodes 12a and 12b are connected across primary 18 of a transformer, generally designated 19, having multiple primary windings. The transformer secondary 20 may be connected to the load circuit (not shown). Each primary winding of the transformer is center-tapped, as at 18a, and is connected to a common conductor 21 which in turn is connnected to the cathode 11.

It will be apparent to those skilled in the art that through use of uniform gas flow and a constant magnetic field, alternating current can be generated by alternately establishing flow of current from the cathode simultaneously to the corresponding anode of each pair of anodes. Thus, if a current path can be established first from the cathode to all of the anodes 12a–16a and then alternatively to all of the anodes 12b–16b, the direction of current flow within the associated halves of each transformer primary to the conductor 21 can be periodically reversed, resulting in an induced A.C. current in the transformer secondary. This has geen graphically illustrated with reference to anodes 15a–15b. Shown in full lines is an arrow indicating by conventional notation current flow from anode 15a to the cathode 11. Such current flow is reduced to zero as flow of current is established between anode 15b and cathode 11, as indicated by the arrow in dash lines.

The present invention concerns various devices for establishing a conductive path alternately between the pairs of anodes and the cathode so that alternating current output can be produced as described in general terms with reference to FIGURE 2.

*Mechanical means for generating alternating current*

In FIGURE 3 is shown a pair of anodes 22 and 23. These are guided for slidable movement by bushings 24 and 25 secured to insulated supports 26 and 27, respectively. The supports themselves are rigidly secured to the exterior of a duct 28 such as has been described in connection with FIGURES 1 and 2. From the foregoing description it will be understood that a common cathode (not shown) is provided within the duct opposite the anodes, and a field coil (not shown) surrounds the exterior of the duct and establishes flux through it.

Each insulated support defines an internal cavity, such as indicated at 29 and 30, into which the associated anode extends. Concentrating attention on anode 22 which is identical to anode 23, it will be noted that it has the form of a cylindrical rod and extends completely through the bushing 24 into the cavity 29. The upper end of the anode is engaged by a cam 31 which is secured for conjoint rotation to a cam shaft 32 driven by a synchronizing motor 33. Rotation of the cam 31 controls movement of the anode towards and away from the interior of the duct 28. The upper end of the anode is maintained in engagement with the cam at all times by a coil spring 34 which bears at one end on the bushing 24 and at its other end on a keeper 35 which is engaged with the anode.

A similar cam 36 is secured to the opposite end of the cam shaft 32 and imparts movement to the anode 23. It will be noted that the cams 31 and 36 are displaced 180° from each other and move the anodes 22 and 23 alternately towards and away from the interior of the duct 28.

Attention is now invited to annular, electrically conductive grid baffles 37 and 38 surrounding the lower ends of the anodes 22 and 23, respectively. The grid baffles are mounted in the insulated supports 26 and 27 and are electrically insulated from both the duct 28 and the anodes by being spaced therefrom. Conductors 39 and 40 are shown in electrical circuit with the grid baffles and, as will be described, maintain a constant potential on the baffles.

Operation of the system may now be considered: It may be assumed in FIGURE 3 that a hot electrically conductive gas stream is moving through the duct 28 towards the right as indicated by the arrow 41. The gas stream, being highly ionized (and hence electrically conductive) and moving through a magnetic field, would readily establish a conductive path to both of the anodes 22 and 23 but for a negative potential which is maintained at all times on the grid baffles 37 and 38. To establish conductivity between the gas stream and anodes, they are alternately moved into and out of the conductive stream by means of the cams and associated mechanism that have been described. Thus, in FIGURE 3, anode 22 is shown in a conductive relationship with the gas stream, while anode 23 is in a nonconducting, retracted position within cavity 30, electrically shielded from the gas stream by grid baffle 38. It will be understood that retraction of anode 22 while anode 23 is simultaneously being advanced toward the gas stream causes conduction to anode 23 while tending to terminate that to anode 22.

The anodes are connected to the ends of transformer primary 42 which is center-tapped at 43 and connected to the cathode at the opposite side of duct 28 as has been described with reference to FIGURE 2. As flow of current reaches a maximum, and then decreases to zero in each half of the transformer primary, flow of current is induced alternately in opposite directions through the transformer secondary, yielding an alternating current output at the secondary. The frequency with which the current alternates is determined by the speed at which shaft 32 is driven by synchronizing motor 33.

*Combined mechanical and aerodynamic means for generating alternating current*

Figure 4:
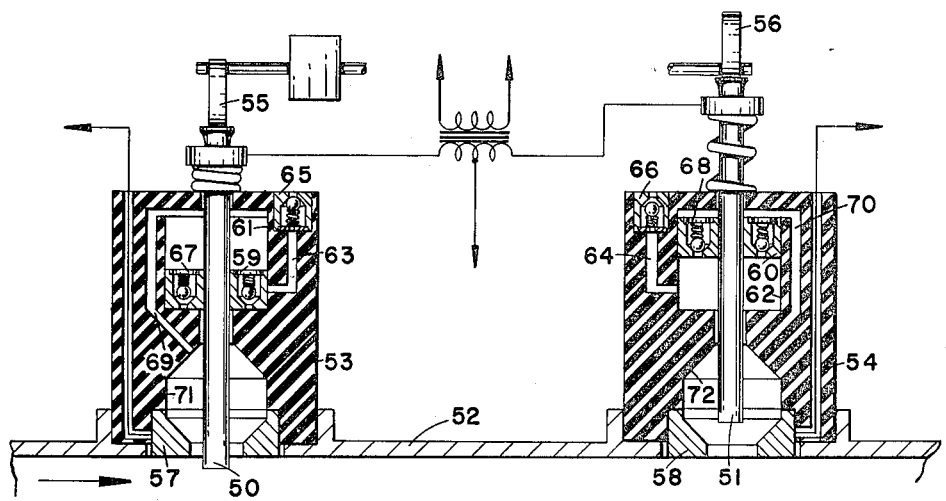
FIGURE 4 is a cross sectional view of mechanical means for alternately establishing conduction between a conductive gas and a pair of electrodes combined with aerodynamic means for assuring termination of the period of conduction with respect to each electrode.

Figure 4 illustrates a mechanical system having movable anodes 50 and 51 which generally is similar to that shown in FIGURE 3. That is to say, the anodes are guided for movement towards and away from duct 52 by insulated supports 53 and 54 under the control of cams 55 and 56 in a manner similar to that described with reference to FIGURE 3. Again, as in the case of the FIGURE 3 embodiment, annular grid baffles 57 and 58 are maintained at a potential suitable for preventing indiscriminate conduction to the anodes 50 and 51. It will be noted, however, that in the FIGURE 4 embodiment, each anode has secured to it for conjoint movement therewith a piston, pistons 59 and 60 being shown associated with the anodes 50 and 51. The pistons are vertically movable within cylindrical bores 61 and 62. The lower end of each bore cooperates with a flow channel, such as 63 and 64, within which is provided a check valve, such as 65 and 66, respectively. As each anode moves away from duct 52 under the guidance of its associated cam, the upward movement of its piston aspirates gas, which may be similar in composition to that in duct 52, through its associated check valve and flow channel. If desired, the aspirated gas may be air, or an organic gas, or any other gas suitable for the purpose. During movement of each anode towards duct 52, the gas aspirated into the lower end of the cylinder in each case is displaced through check valves, such as 67 and 68 provided in pistons 59 and 60, into the upper portion of the associated cylindrical bores. During movement of each anode away from duct 52, the gas is displaced from above each piston through associated ducts 69 and 70 to the cavities 71 and 72 surrounding the lower ends of the anodes 50 and 51.

Operation of the system may now be considered: It will be understood from the foregoing description that the anodes are moved alternately towards and away from the duct 52. As each anode is projected into the conductive gas stream conduction is established, and each anode is retracted as conductivity is terminated. Indiscriminate conduction during periods when the anodes are retracted is prevented by a constant potential maintained on the grid baffles 57 and 58, respectively.

It may be anticipated that under some conditions conduction may be re-established as anode potential increases, particularly if some of the conductive gas immediately adjacent the anodes follows the anodes into the cavities 71 and 72 as the anodes are retracted. To prevent this condition, cold gas aspirated into the cylinders 61 and 62, is displaced into the cavities 71 and 72, respectively, to scavenge the hot conductive gases from the cavities. In this way an abrupt cut-off of the conductive gas path is assured. Movement of each piston is also beneficial in helping to establish conductivity as its associated anode is thrust toward the gas stream. During the initial movement of each anode, its piston tends at first to aspirate hot gas into its associated cavity, such as 71 and 72, prior to displacement of gas past the check valves 67 and 68. This initial movement of gases induces part of the hot conductive gases to move towards the advancing anodes, thus assuring prompt initiation of conduction.

Figure 5:
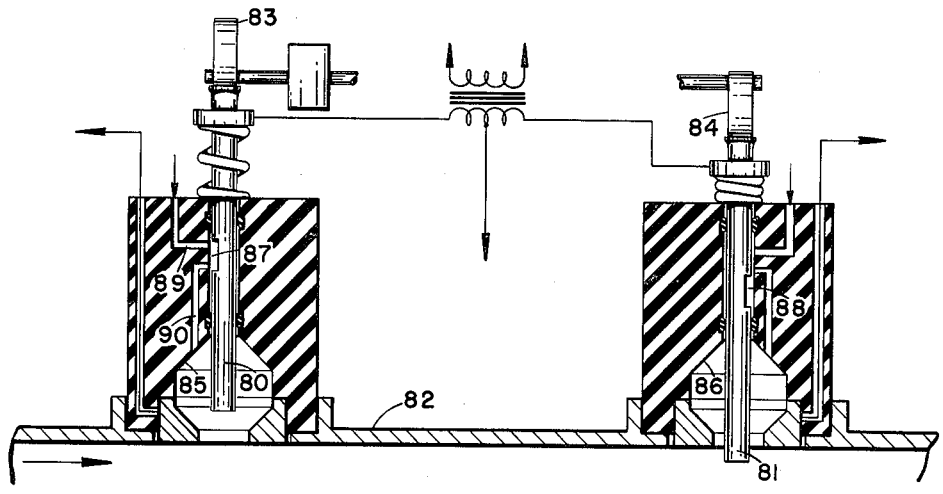
FIGURE 5 shows a modification of combined mechanical-aerodynamic means for establishing conduction with a pair of electrodes.

Another combined mechanical aerodynamic system is shown in FIGURE 5. Here again anodes 80 and 81 are advanced and retracted relative to duct 82 under the control of cams 83 and 84. Instead of relying upon displacement of gas by an associated piston for scavenging the cavities 85 and 86, a longitudinal port is provided in each anode, as at 87 and 88. Since the construction of each anode is similar, the invention can be described with reference to anode 80. At the upper dwell of the anode 80 shown in FIGURE 5, port 87 communicates with a pair of flow channels 89 and 90. Channel 89 is connected to a high pressure gas source (not shown) of a composition that may be comparable to that within duct 82. When the anode is in the position shown, gas from the high pressure source flows through the channels to cavity 85 effectively scavenging any hot conductive gas that may have been drawn into the cavity by the retraction of the anode. As has been explained, this abruptly cuts the conducting path and prevents re-establishment of conduction.

During the time that each anode is moved into the duct 82, its longitudinal port is out of registry with the flow channels and in this way flow of cold nonconducting gas to the region of the anodes is prevented.

*Mechanical system having pilot electrodes*

Figure 6:
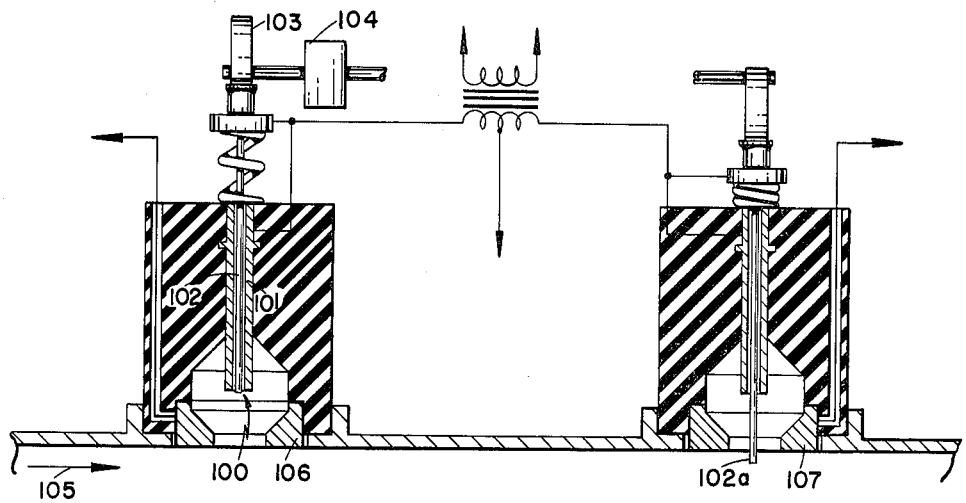
FIGURE 6 is a cross sectional view of mechanical means for establishing a conductive path alternately with a pair of electrodes through use of movable pilot electrodes.

Shown in FIGURE 6 is a modification of the mechanical system shown in FIGURE 3. Each anode, such as that generally designated 100, comprises a stationary outer portion 101 and a movable pilot anode 102 which is slidably positioned within the stationary anode 101. In a manner similar to that described earlier the pilot anode 102 is maintained by spring force in contact with cam 103 at all times. Rotation of the cam under the influence of a synchronizing motor 104 drives the pilot anode 102 towards and away from the hot gas stream, designated by the arrow 105, alternately with pilot anode 102a.

Other details are similar to those described with reference to FIGURE 3. That is to say, a constant potential grid baffle 106–107 is provided at the point where each pilot anode enters the duct to prevent conduction during the time when the anodes are retracted.

The advantage of this construction is that the mass of the movable anodes is reduced. The pilot anode, however, is able to establish conduction with the gas stream and, as it withdraws into its stationary anode, establishes a fully conductive path with both the stationary anode and itself. Thus, using a small, lightweight pilot anode, full conduction can be established with a larger stationary anode.

*Fully aerodynamic system*

FIGURE 7 shows stationary anodes 110–111 which are mounted in insulated supports 112 and 113. These supports are rigidly attached to duct 114 within which flows hot conductive gas, indicated by arrow 115.

Concentrating attention on anode 110, which is similar to that shown at 111, it will be noted that the lower end of the anode extends into a cavity 116 which communicates through an annular grid baffle 117 with the hot gas stream 115.

A poppet valve 118 is provided at the top of the cavity. When forced downward off its seat, it establishes communication between the cavity and an exhaust channel 117a which may be vented to the atmosphere or any other suitable sink.

Movement of the poppet valve is controlled by cam 118a secured to cam shaft 119 driven by a synchronizing motor 120. A spring 121 maintains contact between the upper end of the poppet valve and the cam at all times.

As the cam forces the poppet valve off its seat, the hot gas stream 115, being under high pressure, immediately flows into the cavity 116 under the influence of the low pressure in the exhaust channel 117a. In this way, the highly ionized conductive gas is drawn to the region of anode 110 and establishes conduction therewith. As the poppet valve closes, movement of gas toward the anode ceases and, as soon as the gas adjacent the anode deionizes, the conducting path is cut. Grid baffle 117 prevents conduction until the poppet valve opens again.

By operating the poppet valves 118 and 125 alternately, flow of current to the anodes 110 and 111 can be established alternately, and flow of current through primary halves 122 and 123 to the common center tap 124 can be established alternately. The alternating flow of current in the primary induces an A.C. current in the secondary as has been described.

Electrical system

In each of the foregoing systems a grid baffle has been provided to prevent indiscriminate conduction between the ionized gas stream and the anodes. A constant potential may be maintained on the grid baffles, as by use of the circuit that will be described with reference to FIGURE 9. For many purposes, however, the grid baffles may be allowed to float at a potential determined by diffusion of electrons through the boundary layer of the gas stream. In such case, no connection to the grid baffle is necessary so long as it is electrically isolated from its surroundings.

It is possible, however, to make an alternating current generator in which the grid baffle itself is the primary control element. This is shown and described with reference to FIGURE 8. Here the anodes 130 and 131 are stationary within insulated supports 132 and 133. Each support also positions a conductive grid baffle 134 and 135 adjacent the lower end of associated cavities 136 and 137, respectively. Here again the grid baffles are annular in configuration and the cavities and associated anodes are in communication with the high temperature conductive gas stream 138.

Conductor 139 is connected to the grid baffle 134. A similar conductor 140 is connected to grid baffle 135. These conductors are connected to a grid pulsing circuit, such as an oscillator, which varies the potential on the grid baffles to initiate conduction between the anodes and the gas stream.

Thus, with reference to anode 130, the potential of the grid baffle 134 may periodically be made positive and negative relative to the potential of the gas stream immediately adjacent the grid baffles. During the time that it is positive, the grid baffle promotes movement of electrons from the ionized gas stream to the anode 130 and aids in establishing a conductive path. During the time, however, that the grid baffle is negative, electrons are repulsed from the region of the anodes and no conduction is possible.

By properly synchronizing the potentials applied to each of the grid baffles, each anode may be rendered alternately conductive and an A.C. output may be produced as already explained.

Although the ionized gas stream includes both electrons and positive ions, the mass of the electrons is very much less than that of the ions, and hence movement of the electrons under the influence of the grid baffles becomes the dominant controlling factor in establishing current flow with the anodes.

Electrical circuits

Figure 9:
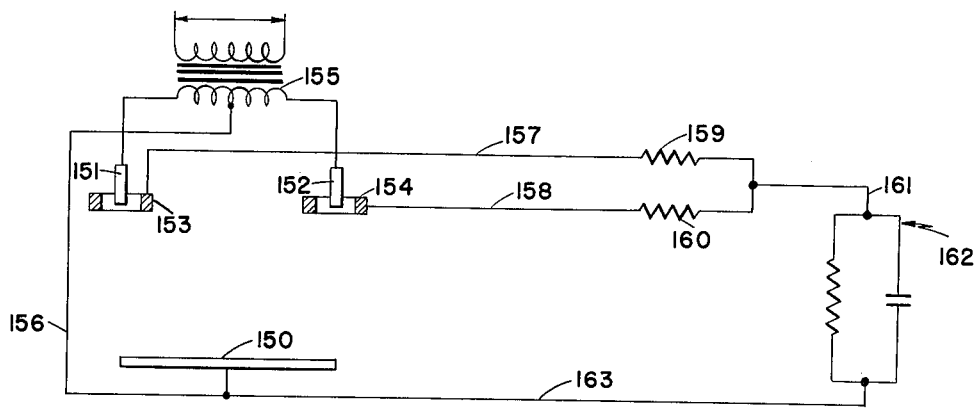
FIGURE 9 shows a diagram of a circuit that may be employed for biasing grid baffles associated with electrodes.

Shown in FIGURE 9 is a diagram of a circuit that may be used for impressing a constant negative potential on the grid baffles. Shown schematically is the cathode 150 and a pair of anodes 151 and 152. Associated with the anodes are grid baffles 153 and 154. As has been explained, the anodes are connected to the opposite ends of a transformer primary 155 which is center-tapped and connected by conductor 156 to the cathode.

The grid baffles are connected by conductors 157 and 158 to resistors 159 and 160 which are connected in parallel through conductor 161 to a parallel R.C. circuit which is generally designated 162. The parallel circuit in turn is connected by conductor 163 to cathode 150.

The small grid current flowing through the resistors and R.C. circuit establishes a voltage at the grids at approximately the mean potential of the gas adjacent the anode side of the flow channel. The net flow of electrons through the grid circuitry from grid to cathode is smoothed out by the parallel R.C. network so that an approximately steady D.C. voltage appears across the network.

In theory at least, the grid baffles could be connected to a constant potential source, such as a battery. This, however, is considered less practical for many purposes, although it is a recognized possibility.

Figure 10:
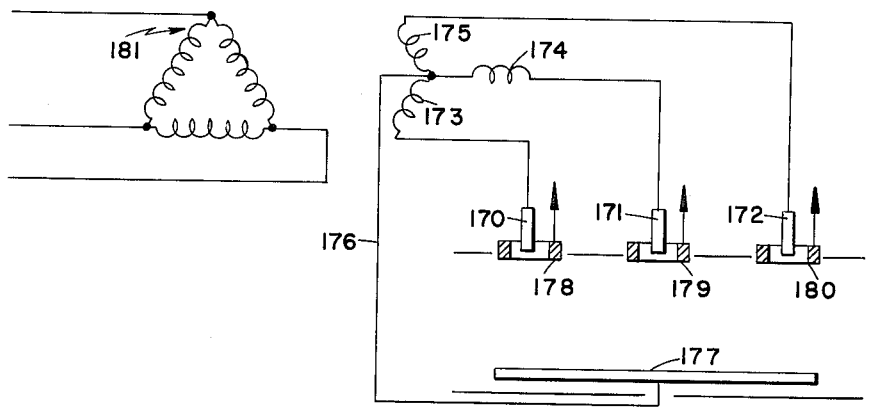
FIGURE 10 shows a circuit diagram illustrating use of an MHD generator for producing polyphase current.

Shown in FIGURE 10 is a diagram of a three phase circuit. Anodes 170, 171 and 172 are connected to primary transformer windings 173, 174 and 175, respectively. The windings are arranged in star formation and connected by a common conductor 176 to the cathode 177. The potential of grid baffles 178, 179 and 180 may be varied in sequence, as described in connection with FIGURE 8 to phase properly the flow of current through the windings 173–175. With proper phasing, three-phase output can be obtained from the delta connected transformer secondary 181 as will be well understood by those skilled in the art.

Reference has been made in FIGURE 10 to a three-phase system using electrical control. It will be apparent that the invention lends itself equally well to both three-phase and other polyphase systems using any of the modifications of the invention disclosed herein.

The use of a simple transformer interconnecting each pair of anodes has been illustrated. It will be understood that the circuit may be modified, if desired, to incorporate sophistications such as used in existing inverter circuits to improve output wave form and increase reliability. It may be desirable in some cases, depending upon the nature of the load, to connect a condenser across the primary of each transformer to insure commutation of the electrodes.

Materials

A wide variety of materials may be used in the construction of an A.C. MHD generator. Obviously the materials must be capable of sustaining high temperatures. Tungsten and carbon, being high temperature conducting materials, lend themselves well to the fabrication of anodes and grid baffles. If water cooling is employed, anodes and grid baffles may be made from copper. Insulators may be made from aluminum oxide. It should be understood that the foregoing materials do not constiute limitations of the invention.

In order to insulate the anodes from their driving cams, it is desirable to make the cams from an insulating material, or to take other steps well-known in the art to insure electrical isolation.

Generator freqencies

The MHD generators described are well adapted to the generation of sixty cycle A.C. current. Frequency of the current is determined by the rate of rotation of the synchronizing motors or, in the case of the electrical system, the oscillator frequency. Although inertia effects may eventually limit the maximum operating frequencies of mechanical and aerodynamic systems, the electrical system is free of such limitations and can operate at much higher frequencies in the order of several megacycles. The eventual limitation on operating frequency of the electrical system is the deionization time of the gas stream adjacent the anodes.

Conclusion

The various features and advantages of the invention are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention as defined by the following claims:

I claim:

1. In combination in an MHD generator having a duct through which flows a high temperature electrically conductive gas and around which is provided an electrical field coil for establishing a magnetic flux through the gas normal to its direction of flow, a cathode within the duct, a plurality of anode assemblies opposite said cathode and aligned perpendicular to the magnetic flux and the direction of gas flow, each of said anode assemblies comprising an electrically conductive anode rod, an insulated support defining a cavity in communication with the gas within the duct, said support guiding said anode rod for movement within the cavity towards and away from the gas within the duct, a rotary cam engaging the end of each anode rod remote from the duct, spring means for maintaining said anode rods in contact with said cams at all times, said cams being phased relative to one another for alternately moving said anode rods towards and away from the conductive gas within the duct, an annular grid baffle positioned by each support concentrically with its cavity between the cavity and the interior of the duct, and an external load circuit including a transformer having multiple primary windings, each primary winding being connected between a pair of anode rods and being center-tapped for common connection to said cathode.

2. In combination in an MHD generator employing a duct conveying a moving stream of electrically conductive fluid, a cathode in communication with the fluid within the duct, a plurality of anodes positioned for linear reciprocating movement towards and away from the fluid within the duct, and means for imparting reciprocating movement to said anodes whereby electrically conductive paths are sequentially established between said anodes through the fluid to said cathode.

3. Apparatus as defined in claim 2 and, in addition, grid baffles adjacent each of said anodes electrically isolated therefrom in position to electrically shield said anodes from the fluid while they are out of conducting relationship therewith.

4. In combination in an MHD device employing a duct conveying a moving stream of electrically conductive fluid, a cathode in communication with the fluid within the duct, a plurality of anodes positioned for movement towards and away from the fluid within the duct, and means for moving said anodes sequentially towards and away from the fluid for sequentially establishing electrically conductive paths through the fluid to said cathode.

5. In combination in an MHD generator having a duct through which flows a high temperature electrically conductive gas and around which is provided an electrical field coil for establishing a magnetic flux through the gas normal to its direction of flow, a cathode within the duct, a plurality of anode assemblies opposite said cathode and aligned perpendicular to the magnetic flux and the direction of gas flow, each of said anode assemblies comprising a stationary electrode and an insulated support defining a cavity in communication with the gas within the duct, said electrode extending into the cavity, valve means for venting gas from the cavities, said valve means being cam operated and being phased for sequential opening and closing movements whereby gas from the duct is induced to flow sequentially into each of the cavities of said anode assemblies, an annular grid baffle positioned by each support concentric with its cavity between the cavity and the interior of the duct, and external circuit means including a transformer having multiple primary windings, each primary winding being connected between a pair of stationary electrodes and being center-tapped for connection to said cathode.

6. An anode assembly for an MHD generator having a duct conveying a moving stream of electrically conductive gas comprising an insulated support adjacent the duct, said support defining an internal cavity in communication with the gas within the duct, a stationary anode positioned in communication with the interior of the cavity, valve means for venting gas from the cavity and inducing movement of conductive gas into conducting relationship with said anode, and a grid baffle between the cavity and the conduction gas stream.

7. In combination with an MHD device employing a moving stream of electrically conductive fluid, a plurality of electrodes in communication with the fluid, and means for sequentially inducing movement of fluid from the stream into conducting relationship with said electrodes.

8. In combination in an MHD generator having a duct through which flows a high temperature electrically conductive gas and around which is provided an electrical field coil for establishing a magnetic flux through the gas normal to its direction of flow, a cathode within the duct, a plurality of anode assemblies opposite said cathode and aligned perpendicular to the magnetic flux and the direction of gas flow, each of said anode assemblies comprising an insulated support defining a cavity in communication with the gas within the duct and a stationary electrode positioned by said support within the cavity, annular grid baffles positioned by and electrically insulated by each support concentrically with its cavity and between the cavity and the interior of the duct, means for sequentially controlling the potential of each of said grid baffles whereby a conductive path is sequentially established between the conductive gas and said electrodes, and an external load circuit interconnecting said electrodes and said cathode.

9. An anode assembly for an MHD generator having a duct for conveying a moving stream of electrically conductive gas comprising an insulating support adjacent the duct, said support defining a cavity in communication with the interior of the duct, a stationary anode in communication with the cavity, and a grid baffle between the cavity and the conductive gas stream.

10. In combination with an MHD device employing a moving stream of electrically conductive fluid, a plurality of electrodes in communication with the fluid, and grid baffle means of controlled electrical potential electrically interposed between said electrodes and the conductive stream for controlling the establishment of electrically conductive paths between the fluid stream and said electrodes.

11. In combination in an MHD generator having a duct through which flows a high temperature electrically conductive gas and around which is provided an electrical field coil for establishing a magnetic flux through the gas normal to its direction of flow, a cathode within the duct, a plurality of anode assemblies opposite said cathode and aligned perpendicular to the magnetic flux and the direction of gas flow, each of said anode assemblies comprising an insulated support defining a cavity in communication with the gas within the duct and a stationary tubular anode positioned by said support and extending into the cavity, a pilot anode slidably supported within each tubular anode concentrically therewith for movement within the cavity towards and away from the gas within the duct, cam means engaged with the end of each pilot anode remote from the duct, spring means for maintaining said pilot anode in contact with said cam means at all times, said cam means being phased relative to one another for alternately moving said pilot anodes towards and away from the conductive gas within the duct for sequentially establishing conduction therewith, an annular grid baffle positioned by each support concentrically with its cavity between the cavity and the interior of the duct, and an external load circuit interconnecting said stationary and pilot anodes with said cathode.

12. An anode assembly for use in an MHD generator employing a moving stream of electrically conductive gas within a duct comprising an insulated support secured to the duct, a cavity within said support in communication with the gas within the duct, a stationary anode extending into the cavity, a pilot anode slidably positioned concentrically within said stationary anode for movement towards and away from the stream of conductive gas, and a grid baffle between the cavity and the conductive gas stream.

13. In combination in an MHD generator employing a duct conveying a moving stream of electrically conductive gas, a cathode in communication with the gas within the duct, a plurality of anodes positioned for linear reciprocating movement towards and away from the gas stream within the duct, means for sequentially imparting reciprocating movements to said anodes for sequentially establishing electrically conductive paths between said anodes through the gas stream to said cathode, and aerodynamic means actuated by movement of said anodes for scavenging conductive gas from adjacent said anodes as they are retracted from the gas stream.

14. Apparatus as defined in claim 13 and, in addition, grid baffles adjacent each of said anodes and electrically isolated therefrom in position to electrically shield them from the gas stream while they are out of conducting relationship therewith.

15. Apparatus as defined in claim 14 in which said aerodynamic means comprises a piston and cylinder associated with each anode, movement of each anode actuating its piston and displacing scavenging gas from its associated cylinder for scavenging conductive gas from adjacent said associated anode as it is retracted from the conductive gas stream.

16. In combination in an MHD generator employing a duct conveying a moving stream of electrically conductive fluid, a plurality of electrically conductive anodes positioned for linear movement towards and away from the fluid within the duct, means for imparting reciprocating movement to said anodes sequentially towards and away from the fluid for sequentially establishing electrically conductive paths between said anodes and the fluid, means for guiding each of said anodes during its movements, each of said anodes defining a gas flow port, said guiding means defining gas flow channels communicating with said ports when said anodes are remote from the fluid stream for admitting gas adjacent said anodes for scavenging conductive fluid from adjacent said anodes as they are retracted from the conductive fluid stream.

17. In combination with an MHD device employing a moving stream of electrically conductive fluid, a plurality of electrodes in communication with the fluid, means for sequentially moving said electrodes into and out of electrically conducting relationship with the fluid, and means for sequentially scavenging conductive fluid from the region of said electrodes as they are withdrawn from conducting relationship with the fluid.

18. In combination in an MHD generator having a duct for conveying an electrically conductive fluid and means for establishing magnetic flux transversely through the fluid as it flows through the duct, a cathode and a plurality of anodes in communication with the fluid within the duct, means for selectively establishing conductive paths through the fluid between said anodes and said cathode, and circuit means interconnecting said anodes and said cathode for conveying electric current from each of said anodes to said cathode as each anode is made electrically conductive with the fluid within the duct.

19. Apparatus as defined in claim 18 in which the magnetic flux is established through the duct normal to the direction of fluid flow and the cathode and anodes are aligned perpendicular to both the direction of fluid flow and the direction of the magnetic flux.

20. In combination in an MHD generator employing a duct for conveying a moving stream of electrically conductive fluid through magnetic flux at an angle to the direction of fluid flow, a plurality of electrodes in communication with the fluid, and means for sequentially establishing electrically conducting paths between said electrodes and the fluid.

References Cited by the Examiner

UNITED STATES PATENTS

| | | | |
|---|---|---|---|
| 1,530,468 | 3/25 | Elliott | 310—11 |
| 2,397,785 | 4/46 | Friedlander | 310—11 X |
| 2,502,236 | 3/50 | Smith | 313—156 |
| 2,722,122 | 11/55 | Soffel | 310—11 X |

FOREIGN PATENTS

| | | |
|---|---|---|
| 841,613 | 6/52 | Germany. |

MILTON O. HIRSHFIELD, *Primary Examiner.*

UNITED STATES PATENT OFFICE
CERTIFICATE OF CORRECTION

Patent No. 3,209,179                                          September 28, 1965

Richard J. Rosa

It is hereby certified that error appears in the above numbered patent requiring correction and that the said Letters Patent should read as corrected below.

Column 1, line 51, for "is" read -- it --; column 3, line 29, for "300°" read -- 3000° --; line 62, after "described" insert -- in connection --.

Signed and sealed this 24th day of May 1966.

(SEAL)
Attest:

ERNEST W. SWIDER                                    EDWARD J. BRENNER
Attesting Officer                                         Commissioner of Patents